(12) United States Patent
Mills et al.

(10) Patent No.: US 7,607,045 B2
(45) Date of Patent: Oct. 20, 2009

(54) SYSTEM AND METHOD FOR TESTING A MODIFICATION TO A PROCESS USING A SIMULATOR

(75) Inventors: Randy S. Mills, Weatherford, TX (US); Ronald E. Dressler, Surprise, AZ (US); Kevin D. Sagis, Denver, CO (US); Rajesh Sugumaran, Pembroke Pines, FL (US); Jayjit Das, West Bengal (IN)

(73) Assignee: American Express Travel Related Services Company, Inc., New York, NY (US)

( * ) Notice: Subject to any disclaimer, the term of this patent is extended or adjusted under 35 U.S.C. 154(b) by 478 days.

(21) Appl. No.: 11/590,818

(22) Filed: Nov. 1, 2006

(65) Prior Publication Data
US 2008/0155334 A1   Jun. 26, 2008

(51) Int. Cl.
*G06F 11/00* (2006.01)
(52) U.S. Cl. .......................... 714/37; 714/712; 703/21; 717/135
(58) Field of Classification Search ........................ None
See application file for complete search history.

(56) References Cited

U.S. PATENT DOCUMENTS

| | | | | |
|---|---|---|---|---|
| 5,394,540 A | * | 2/1995 | Barrington et al. ............ 703/21 |
| 5,442,639 A | * | 8/1995 | Crowder et al. ............. 714/712 |
| 5,621,670 A | * | 4/1997 | Maeda et al. ................. 703/21 |
| 5,862,362 A | * | 1/1999 | Somasegar et al. ............ 703/21 |
| 6,169,610 B1 | * | 1/2001 | Wakasugi .................... 358/442 |
| 6,269,330 B1 | * | 7/2001 | Cidon et al. .................. 714/43 |
| 7,296,080 B2 | * | 11/2007 | Rowley et al. .............. 709/231 |
| 2004/0122645 A1 | * | 6/2004 | Shevenell et al. ............. 703/21 |
| 2009/0037163 A1 | * | 2/2009 | Kong et al. ................... 703/21 |

* cited by examiner

*Primary Examiner*—Christopher S McCarthy
(74) *Attorney, Agent, or Firm*—Fitzpatrick, Cella, Harper & Scinto (57) ABSTRACT

A method of testing a process that has undergone modification. The process consists of multiple steps, and execution of the process involves interaction with multiple interfacing systems. A step consists of, e.g., sending a transmission to an interfacing system. The process is executed in normal fashion by sending transmissions to interfacing systems and obtaining responses to the transmissions from the interfacing systems. The transmissions and the responses thereto obtained from the interfacing systems are stored in a simulator. After the process is modified by modifying a step of the process, the modified process is executed in such a manner that transmissions are sent to the simulator rather than to the interfacing systems. The simulator sends responses to the transmissions. It is determined whether the responses received from the simulator are the expected responses, based on the modification made to the process.

21 Claims, 7 Drawing Sheets

MQ-Based Messages Simulator Flow

Program-to-Program Simulator Flow

FIGURE 5

SYSTEM AND METHOD FOR TESTING A MODIFICATION TO A PROCESS USING A SIMULATOR

BACKGROUND OF THE INVENTION

1. Field of the Invention

The present invention generally relates to methods of testing processes, and in particular to methods of testing large-scale processes involving interaction between multiple systems. The present invention also relates to corresponding systems and apparatuses for testing processes.

2. Related Art

In the normal course of business of many organizations, it is necessary to perform large-scale processes that involve one system interacting with other systems. In addition, in view of, for example, competitive concerns or technological advances, it is often desired to develop (improve or update) such processes in order to increase efficiency, to adapt to changes in, e.g., conditions of operation or input/output requirements, or for other reasons. Such development of a process not only involves modifying the process but also requires testing of the modified process to validate it. Validating the process may here be taken to mean confirming that the modified process still performs its intended purpose, e.g., still achieves its intended results or outcomes in response to known inputs.

Validation of the modified process to a satisfactory level of certainty or reliability is necessary prior to putting the modified process into real-world operation. For, while testing of the process (e.g., every test run) costs time and money, failure of the modified process during real-world operation causes losses which, although possibly indirect or consequential, are likely to be of much greater magnitude. For example, failure of a process during real-world operation may result in loss of customers due to dissatisfaction caused by the failure, or loss of business reputation and/or good will, due to publicization of the failure or of its effects on the organization itself or on others interacting in some fashion with the organization. Such losses attributable to the failure effectively amount to loss of future sales, patronage, support or the like and to increased difficulty in attracting alternative sources of the same to replace such losses. Thus, it is often the case that the real (if not always immediately apparent) costs of failure of the modified process during real-world operation greatly exceed the marginal costs of such further testing (and developing) of the modified process as would have been necessary to prevent the failure (by achieving a higher degree of validation (higher level of reliability) of the modified process).

Accordingly, the need for testing processes, in the course of their development, is both great and ever present. While the cost of real-world failure may dwarf the cost of testing, still the cost of testing is significant. Not only are there the relatively quantifiable costs of an organization's simply physically running the tests (including the costs of creating and maintaining the test environment). But also—as our concern here is particularly with processes involving interaction between the organization's system used to execute the process and other systems used in executing the process—there are the same kinds of costs imposed on the other systems.

(Although the primary concern herein is the testing of processes, the testing organization's system used to execute the process may be referred to as the 'system under test' (i.e., the system being tested), inasmuch as execution of the process on the tester's system is being tested. While the other, interfacing systems are used in executing the process, execution of the process on those systems is not being tested. From the tester's point of view, the execution of the process on/by the other systems is intended to be a constant with respect to the tester's testing and development of the process. In the ensuing discussion, it will often be more convenient to speak of the system, rather than the process, being tested.)

Among the other systems with which the system under test interacts, there may be other systems of the testing organization itself ("internal" systems) and other systems of other entities ("external" systems). While the immediately apparent costs (establishing and maintaining the test environment and running the tests) to systems external to the organization may seem to be borne by the owners of those external systems, these costs may ultimately rebound to the detriment of the organization itself. For example, if the organization requires the performance of an amount of testing deemed by the owner of an external system to be inordinate or excessive in terms of the costs (time, resources, money) imposed on the owner, the owner may balk at or outright refuse continued testing by the organization. In such case, the organization could also lose reputation/good will on the part of the owner, whose services the organization may require. The owner may choose to work with a competitor of the organization that makes lesser testing demands on the owner, rather than working with the organization. The organization may be forced to turn to a different provider of the external system in question, which may charge more for its services. Thus, it is necessary to reduce not only the costs of the testing at the side of the testing organization, but also the costs that the testing imposes on the external systems with which the system under test interacts.

In addition to the costs of testing imposed on each party (namely, the organization performing the testing, on the one hand, and the owner of the other system, on the other hand) individually, there are costs imposed collectively on both parties. Thus, whenever testing is performed involving interaction between the organization's system and another system, there is required a great deal of communication between the organization and the entity administering the other system— planning, coordinating and jointly performing and evaluating the testing. In some cases, a single step in a process may require the organization's system to interact with multiple other systems. The costs of testing a modification of such a step in the process may be greater out of proportion to the number of systems involved, on account of the synergies created, e.g., by the many permutations of interrelationships between the parties involved.

Another problem that arises in testing processes involving systems that interact with other systems is that the other systems may not be consistent in their responses. For example, the same action (e.g., providing a given input to a given external system) performed by the system under test at two different times may result in two different responses from the external system, even though the external system is designed to give the same response to the same input from the system under test, irrespective of the difference in time. The reason for the external system's giving the different response could be that the external system is defective. (In this case, the response is incorrect.) Alternatively, the reason could be that, between the two different times, some factor—outside of the control of the testing organization (e.g., a factor in the external system or a factor in the outside world that affects something in the external system)—changed, legitimately causing the external system to give a different response to the same input from the system under test. (In this case, the response is correct, but is not controlled, and may not be expected, by the testing organization.)

To be sure, in the case where the other system is not defective but simply is affected by some factor such that it legitimately gives a different response to the second performance, it may be possible for the tester to determine whether the second response of the other system is legitimate in view of the factor, and in some cases it may be possible for the tester to use that knowledge so as to be able to make use of the two test runs as valid test runs. However, even in such a case, it will cost the tester time and resources to acquire and apply this knowledge. The costs of acquiring and applying the knowledge may equal or exceed the cost of repeating the test runs. Thus, at the least, the testing of the process is disrupted and made slower and more costly whenever the other system provides inconsistent responses. It is also possible to envision a case in which the results of the testing are degraded because invalid results (based on inconsistent responses from the other systems) were unwittingly included by the tester as valid results. Of course, such a case poses a significant danger of failure of the process (e.g., giving wrong results) during real-world operation.

The above example may be used to shed light on what is involved in testing a process in general. In that example, the system under test performed the same action at two different times. Since the difference in time was irrelevant to how the other system was designed to respond to the action, the other system was expected to give the same response to both performances of the action. More generally, the responses given by an interfacing system to two performances by the system under test should be the same in all respects not relevant to the differences between the performances; the responses should differ only in the way they are expected to differ based on the differences between the performances. Thus, whereas a process is developed by making a change to it that is designed to have a specific effect, the modified process is tested by running it and determining if the actual effects of the change (the differences between the post-modification run and the pre-modification run) are what would be expected based on the change. This is necessarily the nature or logic of testing a process.

This point may be made in less abstract terms, as follows. The developer of the process inserts into the process a change that he has designed to have a specific effect. Thus, the developer knows what effect the change should have (e.g., nature and magnitude of effect) and knows the scope the effect should have (e.g., which parts of the process the effect should affect). Often, the change is expected to have no effect on a large portion of the process. After the change is made, the developer tests the modified process by executing it and observing the results. If upon execution of the modified process, the developer notices effects different in nature, magnitude or scope from that which was expected, then the modified process has failed the test. The change made to the process resulted in unexpected effects. The effects caused by the change will have to be analyzed until they are understood by the developer. When the developer comes to understand why the change caused the effects it did, he will from then on expect the change to cause those effects. When the test run of the modified process results in the effects that are expected in view of the change that was made, the process has passed the test.

In sum, in view of the nature of testing a process and the difficulties attendant thereto, especially if the process includes many operations (e.g., steps) and requires interaction with many systems, there is a need for reducing the costs (in money, time, resources, etc.) of testing, both the costs imposed on the tester and the costs imposed on the owners of other systems with which the system under test is designed to interact in the normal course of its operation. In addition, there is a need for reducing reliance on such other systems altogether, in order to minimize the occurrence of invalid test results and thereby increase the productivity of the testing process.

SUMMARY OF THE INVENTION

The present invention provides a system, method and computer program product for testing a process that meets the above-identified needs.

According to a first aspect of the present invention, a method of testing a process that has undergone modification includes (A) performing a first step in the process by transmitting a first transmission from an application to a first interfacing system, and obtaining a first response to the first transmission from the first interfacing system, (B) performing a second step in the process by transmitting a second transmission from the application to the first or a second interfacing system, and obtaining a second response to the second transmission from the interfacing system to which the second transmission was transmitted, (C) storing the first transmission or data based on the first transmission, the second transmission or data based on the second transmission, the first response or data based on the first response, and the second response or data based on the second response in a simulator adapted to transmit a response in response to a transmission, based on content of the transmission, so as to simulate transmission of a response from an interfacing system, and (D) after the first transmission or the data based on the first transmission, the second transmission or the data based on the second transmission, the first response or the data based on the first response, and the second response or the data based on the second response have been stored in the simulator and the process has been modified by modifying the second step of the process, testing the modified process by (i) performing the first step in the modified process by retransmitting the first transmission from the application to the simulator, and performing the modified second step in the modified process by retransmitting the second transmission from the application, and (ii) determining whether a response from the simulator to the retransmission of the first transmission and/or a response to the retransmission of the second transmission are expected responses, based on the modification made to the second step.

According to a second aspect of the present invention, in the method according to the first aspect, in (D)(i) the modified second step in the process is performed by retransmitting the second transmission from the application to the simulator.

According to a third aspect of the present invention, in the method according to the first aspect the modification of the second step is a modification of a manner in which the second transmission is transmitted.

According to a fourth aspect of the present invention, in the method according to the first aspect the modification of the second step is a modification of content included in the second transmission.

According to a fifth aspect of the present invention, in the method according to the first aspect the modification of the second step is a modification of program code of a computer program used in performing the second step.

According to a sixth aspect of the present invention, in the method according to the first aspect the modification of the second step comprises a change in or a replacement of the interfacing system to which the second transmission was transmitted, and in (D)(i) the modified second step in the process is performed by retransmitting the second transmission from the application to the changed or replacement interfacing system.

According to a seventh aspect of the present invention, the method according to the first aspect further includes (D)(iii) if the response to the retransmission of the first transmission and/or the response to the retransmission of the second transmission is determined in (ii) not to be the respective expected response based on the modification made to the second step, determining a way in which the response to the retransmission of the first transmission and/or the response to the retransmission of the second transmission differs from the respective expected response.

According to other aspects of the present invention, there are provided systems and computer program products corresponding to the above-described methods.

An advantage of the system is that it provides a testing system and apparatus and a method of testing involving a simulator as a replacement for the other systems with which the system under test interacts, so as to minimize the required amount of interaction with the other systems. Accordingly, to a large degree, the other systems do not need to participate in the testing. Thus, to a large degree, the administrators of the other systems do not need to establish and maintain test environments or to run tests. Consequently, the costs imposed on the administrators of the other systems and the costs imposed collectively on the administrators of the system under test and the administrators of the other systems (communication—planning and coordination, joint performance and evaluation, etc.) are greatly reduced.

Also, the use of a simulator in place of the other systems reduces the costs (time, money, resources) of testing for the organization performing the testing of the system under test. Set-up and running of the tests is simplified, and testing may be performed more quickly.

The simulator is designed to give consistent responses to actions (steps of the process) performed by the system under test. The simulator is not affected by changes that occur in the other systems, or by outside changes that affect the other systems but do not affect the system under test. Such changes are generally beyond the control and the knowledge of the testing organization. Since the testing organization employs the simulator and hence, to a large degree, no longer needs to rely on the other systems, the problem of test results being invalidated because of inconsistent/incorrect responses of the other systems is minimized. Controlled, expected and repeatable responses may be obtained more consistently than was the case with the conventional method of running tests by actually interacting with the other systems. Furthermore, if problematic responses are returned by the simulator, the source of the problem is more readily and accurately identifiable (i.e., as residing in the step of the process that was modified) than was the case in the convention testing method, wherein it was possible that the source resided in any of the numerous interacting other systems, including parts of such other systems, or entire systems, that were not directly involved in the step of the process that was modified. Furthermore, with the use of the simulator, or rather multiple such simulators, multiple different (independent) modifications of a process may be tested at the same time independently of each other, as would not be possible in the conventional testing method, in which there is of necessity only one of each real-world other system. In view of the above considerations, it will be understood that accuracy and productivity of testing may be increased.

Finally, the use of a simulator, by simplifying the testing and the logistics thereof, facilitates automation of the testing, which can further increase productivity and reduce costs.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings.

DETAILED DESCRIPTION OF THE INVENTION

The present invention is directed to a system, method and computer program product for testing a process. The present invention is now described in more detail herein in terms of the above exemplary description. This is for convenience only and is not intended to limit the application of the present invention. In fact, after reading the following description, it will be apparent to one skilled in the relevant arts how to implement the following invention in alternative embodiments.

The features and advantages of the present invention will become more apparent from the detailed description set forth below when taken in conjunction with the figures.

The invention is intended to be of particular utility to an organizational entity, e.g., a large corporation, which is required to perform testing of large-scale processes involving interaction between the entity's system(s) on which the processes run and numerous other systems, especially other systems external to the entity. Such testing is often both difficult and expensive to perform, in view of the complicated logistics involved and the large number of parties with which coordination is required. In addition to having to put together and manage a complex testing scenario, the testing organization is necessarily at the mercy of too many other entities. The testing organization is likely to wield inadequate control over the performance of the other entities. Failure on the part of any one of the other entities, at any point in the testing process, can vitiate testing already performed. Retaining the cooperation of the other entities to extend the duration of the testing, in view of the need to reproduce the invalidated testing, can prove difficult and costly.

Although the invention may be applied to the testing of any process, one intended application of the invention is for processes for performing financial services. In what follows, an example of the invention as applied to testing the processing of an application for a new credit card account will be explained with reference to the figures.

The processing of a credit card application by a bank or other issuing entity, in order to determine whether to approve or decline the applicant, is generally an extensive process involving interaction between the processing system(s) of the issuing agency and other systems of the issuing agency as well as other systems of multiple other entities. (The term "internal" will be used to refer to systems of the issuing agency (the entity performing the testing of the process) and the term "external" will be used to refer to systems of other entities.)

The processing of a credit card application may involve a number of discrete steps or actions of the order of magnitude of, e.g., 100. Examples of the general types of these actions are verification actions, validation actions and scoring actions.

Verification refers to verification of the identity of the applicant. In order to verify the applicant's identity, the system performing the application processing will generally have to transmit and/or receive data from a database of another system. Matching of the applicant's identity data with like data from the database, or some other verification process, will generally have to be performed. As an initial step, verification may proceed by data transfer between the system and an internal database. If the applicant is already known to the issuing agency (e.g., the applicant already has another account with the issuing agency), the internal database is likely to contain data sufficient to verify the applicant's identity. If the applicant is not known to the issuing agency, verification would proceed by means of a subsequent step of data transfer between the system and an external database. If the external database lacks data sufficient to verify the applicant's identity, verification may proceed by means of subsequent steps, as necessary, of data transfer between the system and one or more other external databases, until verification can be achieved or the databases have been exhausted. Thus, verification is expected to involve a number of steps (greater in proportion to the number of databases that need to be consulted) of data transfer, data processing (e.g., matching), and the like.

Validation refers to validation of the data contained in the application, i.e., confirming the accuracy of the data. Similar to verification, validation would also be expected to require data transfer between the system and one or more (first internal, then, if necessary, external) other systems, and a matching process or other process to perform the validation. Thus, validation would involve a series of steps similar to those carried out in verification.

Scoring refers to evaluation of the worthiness of the data contained in the application. Different kinds of scoring may be performed in the processing of a credit card application. For example, the application may be scored for credit worthiness or other aspects of commercial viability, reliability or the like. Some types of scoring may be performed by internal systems and others by external systems. Like validation and verification, scoring involves data transfer between the system and one or more other systems, data processing, and evaluation or modeling of data, or the like.

It is not necessary to the present invention that verification, validation, scoring or the like processes be performed. The discussions of these processes are meant to illustrate examples of possible types of processes (or subprocesses) of the sort to which the present invention may be applied. It is expected that the processes to which the present invention would be applied may frequently involve data handling or manipulation subprocesses such as those involved in verification, validation and scoring. The term "subprocess" is used to mean a portion of a process. Of course, what is a subprocess in one context could be a process in another; the term "subprocess" may be used simply for convenience when the discussion warrants it. The terminology "data handling or manipulation" is used as general terminology to refer to any process wherein data is acted upon in any way, e.g., data transfer, data processing, evaluation of data, modeling of data, etc.

An example of an external system would be a credit bureau or, more specifically, a system or database of a credit bureau. For example, the performance of verification, validation or scoring could involve interacting with a credit bureau system or database. The processing of a credit card application could involve interacting with, e.g., tens of different external systems.

As an example, suppose that, for a given bank, the processing of a credit card application involves performing 100 discrete steps or actions and interacting with at least 15 but up to 30 other systems (as explained above, the number of other systems with which the system under test interacts may vary depending on the particular data contained in a particular credit card application). Thus, whenever, in the real world, the bank processes a credit card application, the bank's processing system will have to perform each of the 100 steps and to interact with the at least 15 and up to 30 other systems. Some of the 100 steps do not require interaction with other systems, but many do. For each of the steps that requires interaction with other systems, the number (or the minimum and maximum numbers) of other systems with which the system under test must interact is known in advance. For each step that involves interaction with another system, the step itself will include some action directed toward the other system, and, in response, the other system will perform some action ('response') directed toward the system. For example, the step may involve sending a request for data to the other system and, in response, the other system would retrieve the data and send it to the requesting system. The response sent back by the other system to the system under test would include the requested data. The other system thus creates its response based on the content of the request. Thus, the content of the response sent by the other system in response to the request is determined by the other system based on the content of the request.

Suppose a modification is made to the overall 100-step process to effect some improvement. The modification is a modification of, e.g., only 1 of the 100 steps of the process. After the process is modified in this fashion, before it can be used for real-world processing of a credit card application, the modified process must be tested to make sure that it runs properly. Not only must it be confirmed that the one modified step of the process performs properly, but also it must be confirmed that the 99 unmodified steps of the process perform properly.

For example, it must be confirmed that the modification made to the single step did not cause unintended changes to any of the 99 unmodified steps. In order to test the modification of the process, it is necessary to perform a test run of the entire 100-step process to confirm that not only that the modified step performs in the manner expected in view of the modification made thereto but also that the 99 unmodified steps perform in the manner expected in view of the modification made to the one step.

In some cases, it will be expected, based on the modification made to the one step, that the 99 unmodified steps should perform in the same way as they performed (e.g., should receive the same responses they used to receive) prior to making the modification to the one step. In this case, that is, the modification to the one step is not supposed to affect the other steps. An example of such a modification would be the addition of data being sent in a given step to a given other system, where the data is newly required by the other system for its own internal purposes (e.g., its own recordkeeping purposes) but has no function in or intended effect on the rest of the process or the other systems.

In other cases, it will be expected, based on the modification made to the one step, that the 99 unmodified steps should perform in a way that is different from the way they performed (e.g., should receive responses different from the responses they used to receive) prior to making the modification to the one step. The difference in performance (responses) would be known in advance, based on the modification made to the one step. In this case, then, the modification to the one step is expected to affect some other step(s) in a predetermined way. An example of such a modification would be the changing a rule (e.g., criterion) used in one step of a decision-making subprocess (of the process under test) the result of which determines a response that is output in a subsequent step of the process under test.

Just as the modification made to the one step may or may not be supposed to affect (change) the performance (outcome) of the 99 unmodified steps, so too it may or may not be supposed to affect the outcome of the modified step. For example, if the modification to the one step is simply a rewriting of the program code in order to make the code run more efficiently from a computer-programming point of view, then the modification would not be expected to affect the substantive outcome (e.g., the response received by the system in response to the performance) of the one modified step. In this case, the modification is intended to affect events only at the level of the underlying program code, not at the top level of the method or process. On the other hand, if the modification were, for example, the insertion of a new data field in a data request, it would be expected that the response to the modified data request would include an input in the new data field and thus the outcome of the modified step would be affected by the modification thereto.

In the prior art, a test run of the modified process would be performed, for example, in the same way that non-test runs, i.e., real-world performances of the process, are performed. Thus, a test run would involve not only performing each of the 100 steps of the process, but also interacting with each of the at least 15 and up to 30 other systems. Whenever the process was developed (e.g., modified), test runs of the entire process would be required. Whenever a test run was required, interaction with the other systems would be required, such that the other systems would be required to have their test environments operational, participate in the tests, coordinate the testing with the testing organization, and so on. As explained above, this testing scenario or paradigm entails significant costs, difficulties, and risks of many types for all parties involved, the testing organization and the owners/administrators of the other systems.

In contrast to the prior art, the present invention permits a testing scenario in which, when a test run of the process is performed, each of the 100 steps of the process is performed, but without having to interact with the other systems. (To be sure, there may be situations in which a modified process would be tested by interacting with one or more of the other system(s). An example of such a situation would be when the modification made to the process consists of a change in one of the other systems or its mode of operation, or replacement of one of the other systems by a new system. In such a case, the testing of the modified process may be performed in a manner that includes interacting with the changed or replacement system.)

The testing scenario of the present invention, whereby interaction with the other systems is made generally unnecessary, is provided by the following means. First, a sample run of the unmodified process is performed, in the normal way that a real-world run of the process would be performed, that is, performing each of the 100 steps of the process, and interacting with each of the at least 15 and up to 30 other systems as required by the steps of the process. The 100 steps (e.g., transmissions sent by the system under test to the other systems) and the responses received to the 100 steps (transmissions) by the system under test from the other systems are stored in a simulator. The steps (transmissions) and the responses are stored in such a manner that each step (transmission) is associated with the response received thereto. (As will be understood by those of skill in the pertinent arts, the manner of such storage and association may vary based on considerations of, e.g., efficiency, etc. Thus, it is not necessary that an actual transmission be stored in association with the actual response received thereto. For example, data extracted from the transmissions and responses, data converted from the transmission and response data, data based on, representative of, or identifying the transmissions and responses, or the like may be stored rather than the actual transmissions and responses. An effective association between a given transmission and the response received thereto may be stored by using such data or suitable variants thereof. In sum, effective storage and association may be achieved by any of a wide range of suitable means such as would be known to those of skill in the pertinent arts. For the sake of convenience, in the ensuing discussion reference may be made to storage and association of (actual) transmissions, responses, or the like. However, such reference is to be understood as encompassing the possibility of such alternate modes of effective storage and association as have been discussed above.) For each one of the other systems with which the system under tests interacts, there is provided in the simulator a simulator module corresponding to that particular other system. Each response and corresponding transmission may be stored in the particular simulator module that corresponds to the particular other system that sent the response. The simulator is designed to simulate the other systems with which the system under test interacts, and hence to eliminate the need for actually interacting with the other systems when performing tests. Thus, when the system under test sends a transmission (e.g., a request for data) to the simulator, the simulator sends the system under test a response to the transmission that is the same response that the corresponding other system would have sent to the system under test had the request been sent to the other system. The simulator is thus designed to send a response to a transmission, using the stored associations between transmissions and their respective responses. Thus, the response sent by the simulator is determined by the content of the transmission, although the mode of determination may differ from that used by the corresponding other system (when the other system is employed rather than the simulator to send a response to the transmission).

Sample runs of the unmodified process are performed, the responses being obtained from the other systems and the transmissions and respective responses being stored in association in the simulator (as described above), in sufficient quantity so as to cover a full range of possible types of transmissions and responses. For example, if a given step of the process consisted of sending a given set of data for a given applicant to a given credit bureau, the process may be rerun a sufficient number of times to cover all types of significant variations in the set of data as could be expected to occur in real-world execution of the process. A significant variation in the data would be a variation in any given item of the set of data that could affect the response that the credit bureau sends back to the system under test. For example, suppose the credit bureau uses applicant age as one of several bases for determining credit risk. Suppose the credit bureau assigned a (magnitude of) credit risk of x to applicants between age 18 and 25, y to applicants between age 26-35, and z to applicants above age 35. Then, varying applicant age from 18 to 24 would not be significant, but varying applicant age from 24 to 26 would be significant.

After the appropriate range and number of sample runs of the unmodified process have been performed and the obtained responses from the other systems have been stored in the simulator, the testing scenario provided by the invention may be implemented. (To be sure, prior to commencing such testing using the simulator, it may be desired to perform one or more sample runs of the unmodified process using the simulator to check that the results obtained are the same as those that were obtained in the sample run using the other systems.)

According to the testing scenario provided by the invention, after the process is modified, by modifying, e.g., one step of the process, the testing of the modified process may be performed using the simulator rather than the other systems. That is, the modified process is tested by executing it in the normal way, except that wherever in the process it is normally necessary to interact with another system, the interaction is performed with the simulator instead of the other system. Accordingly, interaction with the other systems may be generally eliminated. Thus, coordination with, and reliance on, the other systems may be avoided. Moreover, by using the simulator to give prerecorded responses instead of actually interfacing with the other systems, the modified process may be tested more efficiently, since it is ensured that the responses do not change due to factors specific to the other systems (e.g., defects in the other systems or changes in or affecting specifically the other systems), such factors being generally beyond the control and knowledge of the testor. If the modified process fails or does not perform as expected (whether it be in the modified step or in an unmodified step, or as a whole), the testor knows that the source of the problem lies in the modified step. Thus, e.g., if modifying step 49 of the process results in an unintended adverse consequence in step 77 of the process, the testor knows that the source of the problem in step 77 is the modification made to step 49. In contrast, in the testing scenario of the prior art, the testor would not know if the source of the problem in step 77 lay in the modification made to step 49 or in some unknown event that occurred somewhere in the interactions with the 15 to 30 other systems, the event having been caused by a change that took place outside the system under test between the time of the post-modification test run of the process and the time of the pre-modification run of the process. In the case of a complex process, i.e., a process comprising a large number of steps and interacting with a large number of systems, the task of tracking down the source of such a problem could be unwieldy in terms of logistics and coordination with the parties responsible for the other systems. The difficulty of such a task could limit the improvement, attempts at development, and even the usage, of such complex systems.

In a case in which a modification made to one step in the process is not expected to have an effect on any steps in the process, after the modified process is run using the simulator the responses received from the simulator to the steps will be checked to see if they are the same as the responses received during a corresponding sample run of the unmodified process. If the responses are not the same, the nature of the difference may be analyzed to help determine the nature of the problem caused by the modification.

In a case in which a modification made to one step in the process is expected to have certain effect(s) on given step(s) (the modified step and/or other steps) in the process, after the modified process is run using the simulator the responses received from the simulator to the given steps will be checked to see if they differ from the corresponding responses received during a corresponding sample run of the unmodified process, in the way that is expected in view of the modification made. If they differ in a way that is different from what is expected, the nature of the difference may be analyzed to help determine the nature of the problem caused by the modification.

It is expected that many applications of the invention will be to processes that are in part or whole performed by means of or with the assistance of a computer program. In such cases, a typical if general example of the kind of modifications that may be desired to be made to the process would be a change in a portion of the program code of the computer program (e.g., the program code for performing one or more given steps), or a change of a (e.g., data) file used in the computer program. (The term "change" is meant to include not only a change but also an addition and/or a deletion.) Such a change could be made to increase the efficiency of the computer program, to fix a glitch, or for other reasons. As a more specific example, it could be desired to make a change in the fields of a data file being transferred between the system under test and another system. For example, it could be wanted to add a new field so as to be able to provide additional input data to another system, or additional output data in the response from the other system to the system under test, for the purpose of performing verification, validation or scoring. Again, it could be desired, for example, to change the permitted range of values that can be entered in a given field.

Another type of modification that might be desired is to replace one of the other systems (with which the system under test interacts) with a new other system. For example, one of the other systems could require replacement because it ceased to be operational (e.g., a credit bureau goes out of business), or a new system could have come into existence (e.g., a new credit bureau is established) that is superior to the existing other system that had been used by the system under test. In this case, it may be desired to perform a test run of the process by using the simulator for all steps not normally involving interaction with the (replacement) other system, and using the replacement other system for steps that do normally involve interaction with the replacement system. Thus, as noted above, even when the invention is put into operation, there may still be situations in which it is necessary or desirable to test a modified process in a manner that involves interacting with (an)other real-world system(s). Hence—at least on account of the possibility of changes occurring in or affecting specifically the other systems, which changes may warrant modification of the process/system under test—reliance on other systems for the performance of testing is not necessarily completely eliminated by the present invention. Over the course of time, it is envisioned that changes external to the process/system under test may warrant replacement of certain ones of the other, interacting systems, requiring temporary interaction with the replacement systems. Once the process under test has been modified to take account of the change in or replacement of the interacting system, and the modified process has been tested and shown to perform properly, interaction with the changed/replacement system would no longer be necessary.

Those of skill in the pertinent arts will appreciate that a wide range of other kinds of modifications may be desired or required to make to processes such as those of the types discussed herein. Such other kinds of modifications may be modifications in, e.g., the content of a transmission, the manner of transmitting a transmission, the program code used in implementing a process step, or other elements or aspects of a process such as would be understood by those of skill in the pertinent arts. The present invention is intended to be applicable to all such modifications.

As a specific example of the type of testing that may be performed on a process after a modification is made, so-called regression tests may be cited. In a regression test used to test the processing of a credit card application, an application containing data that is known to yield an approval, or an application containing data that is known to yield a rejection, is processed. That is, it is known that, prior to the modification, when the process was run in the normal way, the contents of the application would generate an approval or a rejection, as the case may be. The modification made to the process is not intended to affect the substantive outcome of the process (viz., approval or rejection)—not intended to affect the contents of the application responsible for generating the approval or rejection. Rather, the modification may be intended, e.g., to increase efficiency by improving program code implementing the process, to adapt to a change in technology or in market conditions, etc. The modified process is tested to determine if it yields the correct outcome (approval or rejection, as the case may be)—to ensure that the modification has not affected the substantive outcome.

The present invention is intended to be applicable to a wide range of processes, which may be modified and tested in a wide range of ways. It is understood that those of skill in the pertinent arts would appreciate these ranges of processes, modifications, and testing.

In order to better appreciate the invention, a discussion thereof with reference to the accompanying figures follows. To the extent that the details of elements or aspects of the invention are not included in the foregoing or subsequent discussion, it is understood that such details would be known to those of skill in the relevant arts.

Figure 1:
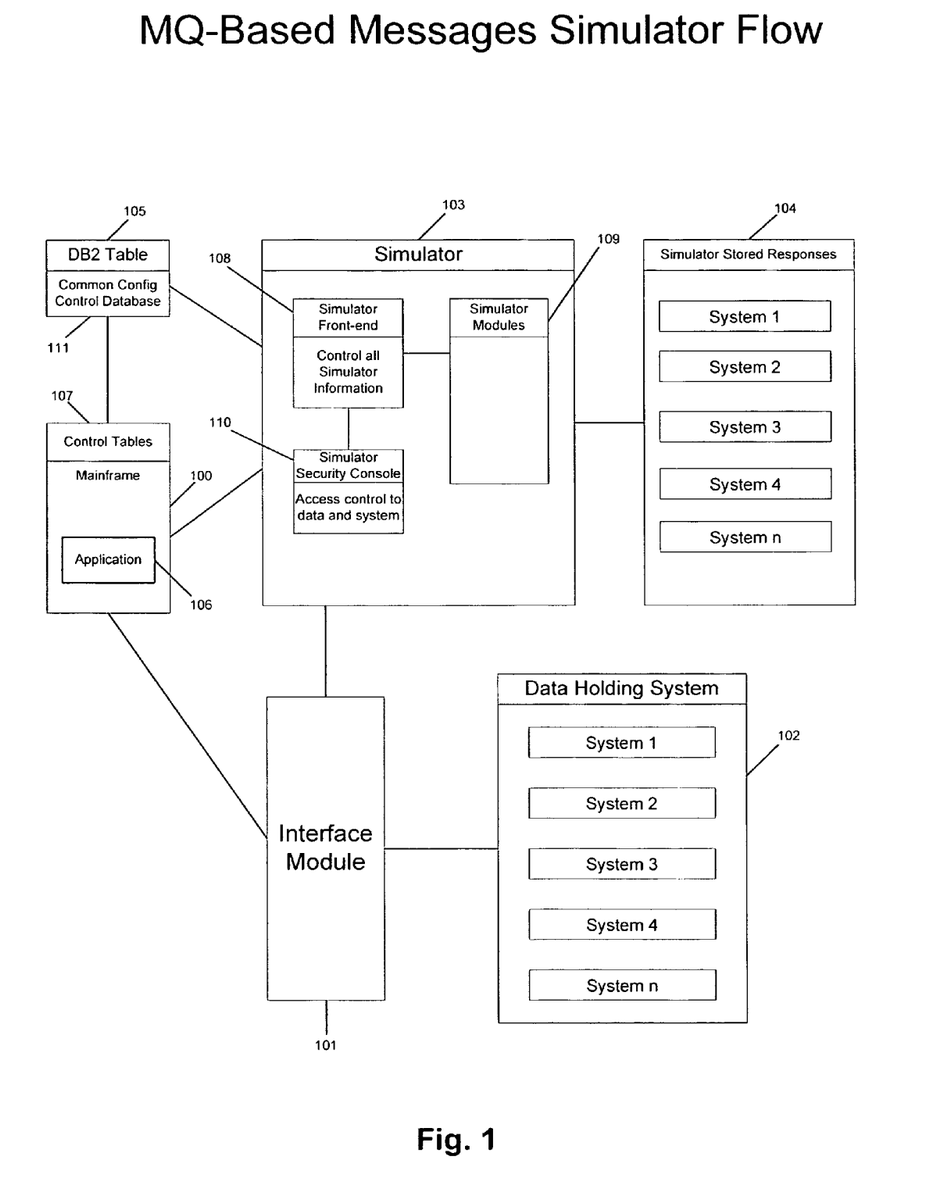
FIG. 1 is a schematic diagram illustrating a testing system and apparatus.

FIG. 1 is a schematic diagram illustrating a testing system or apparatus according to the present invention. (Those of skill in the pertinent arts will understand that FIG. 1 may be understood as representing either a system or an apparatus. For ease of discussion, the terms "system" and "apparatus" may be used interchangeably herein.) The system shown in FIG. 1 may be operated in different modes, as will be explained below. Depending on the mode employed, the system can function as a simulator or as a recorder. As a simulator, the system is used to perform simulations, which may be used for testing a process that has undergone modification (e.g., a process under development). As a recorder, the system may be used to obtain stored simulated responses, which are used in performing the simulations. The system may also be used simply to perform a process, without regard to testing of the process.

As shown in FIG. 1, the testing system includes a mainframe computer 100, an interface module 101, a data holding system 102, a simulator 103, a simulator stored response unit 104, and a DB2 table 105. An application 106 runs on mainframe computer 100. Mainframe computer 100 also includes control tables 107, which are used for data storage. Data holding system 102 includes one or more real-world systems (1, 2, 3, 4, . . . , n), with which application 106 interacts, via interface module 101. Simulator stored response unit 104 includes one or more systems (1, 2, 3, 4, . . . , n) corresponding to the one or more real-world systems of data holding system 102, respectively. When application 106 is simply being executed as a process and not being tested, or when the system is operating as a recorder (explained below), application 106 interacts with the systems of data holding system 102. When application 106 is being tested (i.e., the system is operating as a simulator (explained below)), application 106 generally interacts with the systems of simulator stored response unit 104 rather than with the systems of data holding system 102. Simulator 103 includes simulator front end 108 (which controls all simulator information), simulator modules 109 and simulator security console 110 (which controls access to data and the system). DB2 table 105, which is subject to control by application 106 and simulator 103, includes common configuration control database 111, in which control information is stored.

Figure 2A:
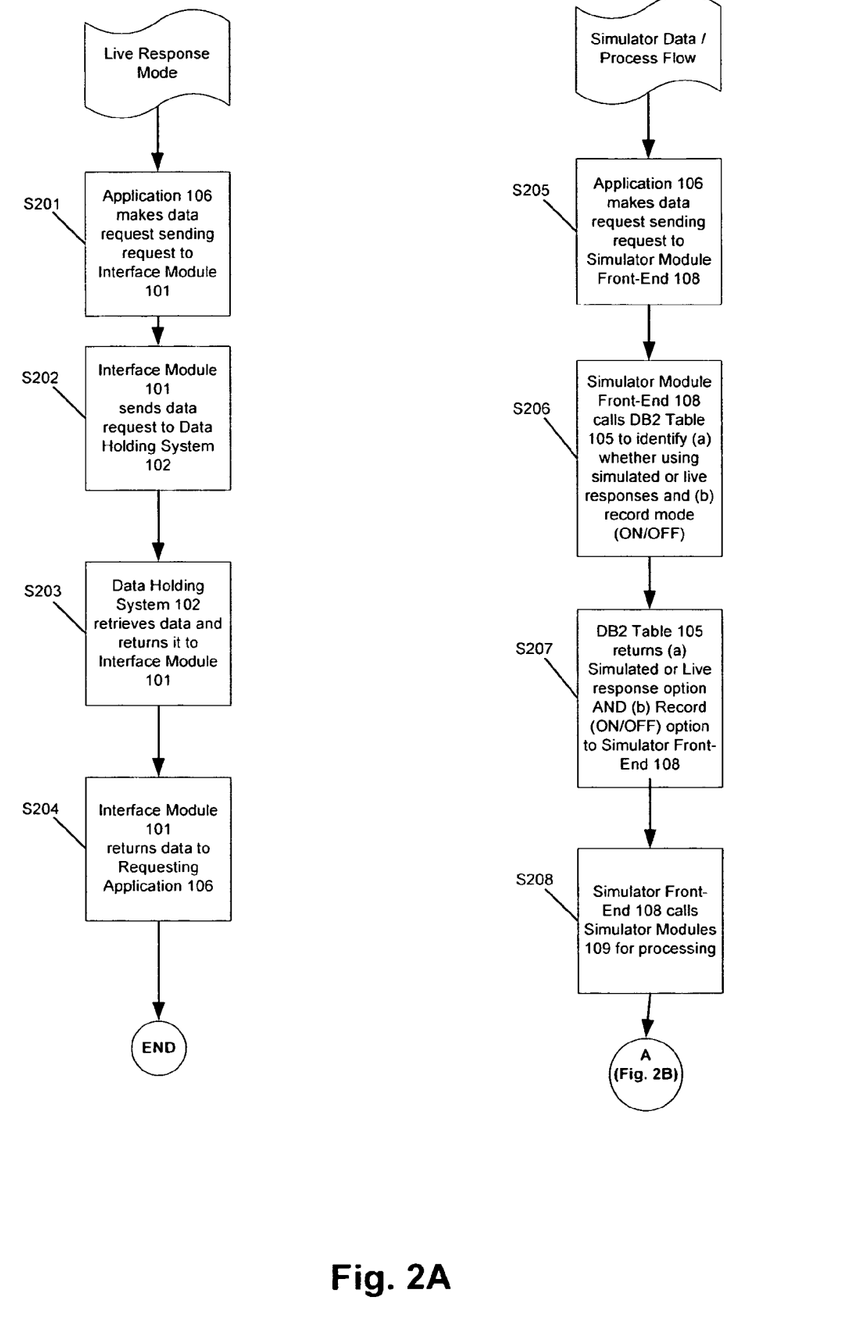
FIGS. 2A and 2B are flow charts illustrating methods of testing a process, by operating the testing system and apparatus of FIG. 1.
Figure 2B:
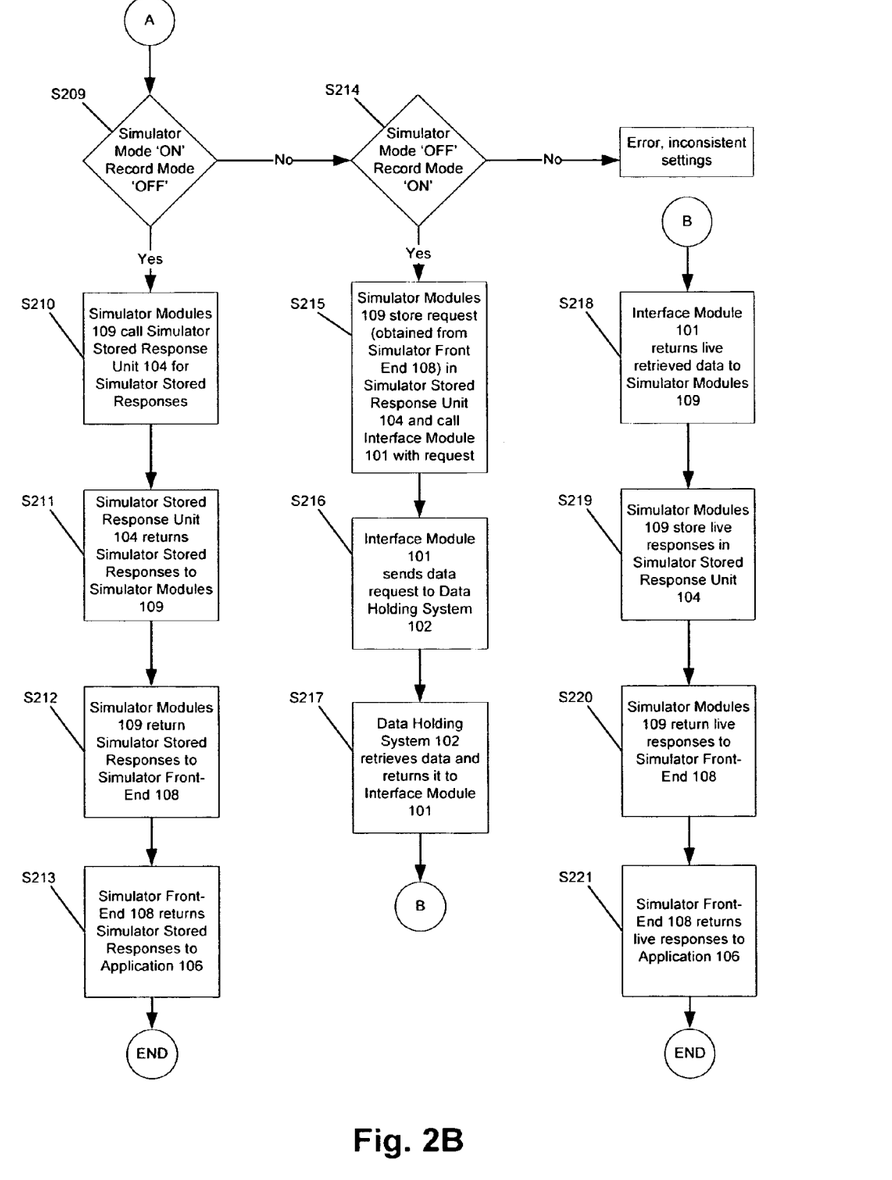

FIGS. 2A and 2B are flow charts illustrating methods of testing a process according to the present invention, by operating the testing system and apparatus of FIG. 1 in various modes.

The various modes of operation of the system are defined by the status of two variables of the system: (1) (response mode (live response vs. simulated response), and (2) recording mode (ON or OFF). The statuses of these two variables are set so as to select the operating mode of the system. The various operating modes are described below.

The system may be run in live response mode, with recording mode OFF. This may be thought of as corresponding to a real-world performance of the process, rather than a testing of the process. The process is performed, interacting with the other systems with which the process would normally interact in a real-world performance of the process (i.e., the systems of data holding system 102). The live responses obtained from the other systems are not necessarily stored for future use.

The system may be run in live response mode, with recording mode ON. In this mode, the system is operating as a recorder. The process is performed, interacting with the other systems with which the process would normally interact in a real-world performance of the process. However, the live responses obtained from the other systems are recorded (stored) by the system for future use as simulated responses.

The system may be run in simulated response (simulation) mode, with recording mode OFF. In this mode, the system is operating as a simulator. This mode is used to test a process that has undergone modification (e.g., in one step of the process). The process is performed, interacting with the systems of the simulator stored response unit. (As noted, there are situations in which in this mode the modified step of the process may be performed by interacting with the other real-world system(s) rather than with the simulator.) Stored simulated responses (and live responses if any) are obtained from the interacting systems of the simulator stored response unit (and from the interacting real-world other systems, if any). The run of the modified process is evaluated to determine if the responses received are as expected in view of the modification made to the process. If the responses are not as expected, further analysis of the responses may be performed to determine the nature of the problem introduced by the modification.

The system may not be run in simulated response mode with recording mode ON. This is not a valid system operation mode.

Exemplary data flows of the various operating modes will now be explained with reference to the figures pertinent thereto. Turning to FIG. 2A, the data flow of the live response mode with recording mode OFF is illustrated under the heading "Live Response Mode." In step S201, application 106 sends a request to interface module 101. In step S202, interface module 101 sends the request to data holding system 102. The request is forwarded to the intended recipient among the various n other systems of data holding system 102. In step S203, data holding system 102 retrieves the requested data from the intended recipient system and returns it to interface module 101. In step S204, interface module 101 returns the requested data to application 106. The data flow ends after step S204.

The data flows of the live response mode with recording mode ON (the system operating as a recorder) and the simulated response mode with recording mode OFF (the system operating as a simulator) are illustrated under the heading "Simulator Data/Process Flow." In step S205, application 106 sends a request to simulator front end 108. In step S206, simulator front end 108 calls DB2 Table 105 to obtain the mode information identifying which mode of operation of the system has been selected (i.e., the status of each of the two variables described above, namely, response mode (live response vs. simulated response) and recoding mode (ON/OFF)). In step S207, DB2 Table 105 sends the mode information to simulator front end 108. In step S208, simulator front end 108 calls simulator modules 109 for processing. In steps S209 and (if necessary) S214, simulator modules 109 determine the selected mode of operation of the system by reference to the mode information (the diamond shape of the boxes for steps S209 and S214 shown in FIG. 2B indicates a decision box).

If it is determined that the recorder mode (simulator mode OFF (=live response mode ON); record mode ON) has been selected, the data flow proceeds to step S215.

If it is determined that the simulator mode (simulator mode ON (=live response mode OFF); record mode OFF) has been selected, the data flow proceeds to step S210.

If other collective states of the variables have been selected, the simulator deems the selected mode to be invalid. (It may be noted that, among the two invalid modes (namely, (1) simulator mode OFF (=live response mode ON) and record mode OFF and (2) simulator mode ON (=live response mode OFF) and record mode ON), (1) corresponds to the data flow illustrated under the heading "Live Response Mode." This is a valid mode of operation of the system. However, if this mode of operation has been selected, the data flow does not go through simulator 103.)

If at step S214 the recorder mode has been selected, then in step S215 simulator modules 109 store the request (obtained from simulator front end 108) in simulator stored response unit 104 and call interface module 101 with the request. In step S216, interface module 101 sends the request to data holding system 102. In step S217, data holding system 102 retrieves the requested data from the intended recipient system and returns it to interface module 101. In step S218, interface module 101 returns the requested data (live response) to simulator modules 109. In step S219, simulator modules 109 record (store) the live responses in simulator stored response unit 104. In step S220, simulator modules 109 return the live responses to simulator front end 108. In step S221, simulator front end 108 returns the live responses to application 106. The data flow ends after step S221.

Thus, as seen, in the recording mode, live responses are obtained from the real-world other systems, and the live responses are both returned to the application and stored in the simulator stored response unit for future use. The requests made by the application are also stored in the simulator stored response unit for future use. The stored requests and responses will be used by the system when the system is operated as a simulator, to test the process after it has undergone modification. The requests and responses or, e.g. (as discussed above), data extracted or converted therefrom or based thereon, are stored in such a manner that the requests are effectively correlated (associated) with their corresponding responses. The simulator makes use of this correlation to send out correct stored responses when the system is used in simulator mode.

If at step S209 the simulator mode is selected, then in step S210, simulator modules 109 send the request to simulator stored response unit 104 for a stored response. In step S211, simulator stored response unit 104 returns a stored response to simulator modules 109. In step S212, simulator modules 109 return the stored response to simulator front end 108. In step S213, simulator front end 108 returns the stored response to application 106. The data flow ends after step S213.

Thus, as seen, in the simulator mode, the responses that were stored during the recording mode are obtained from simulator stored response unit 104 rather than live responses being obtained from the real-world other systems. The stored responses are returned to the application. The performance/outcome of the modified process, performed using the stored responses, is evaluated for the presence of problems (i.e., non-conformity to expected responses/outcome). Given that only a single part of the process has been modified, the source of any such problems may be traced to the modified part of the process. In this way, modifications of discrete portions of the process may be tested in an efficient manner, since the sources of problems may be identified quickly, easily and accurately. In addition, since the source of problems can be thus pinpointed, it is easy and productive to test modifications of different parts of the process at the same time, independently of each other. Thus, the testing and development of the process is made still more efficient.

Figure 3:
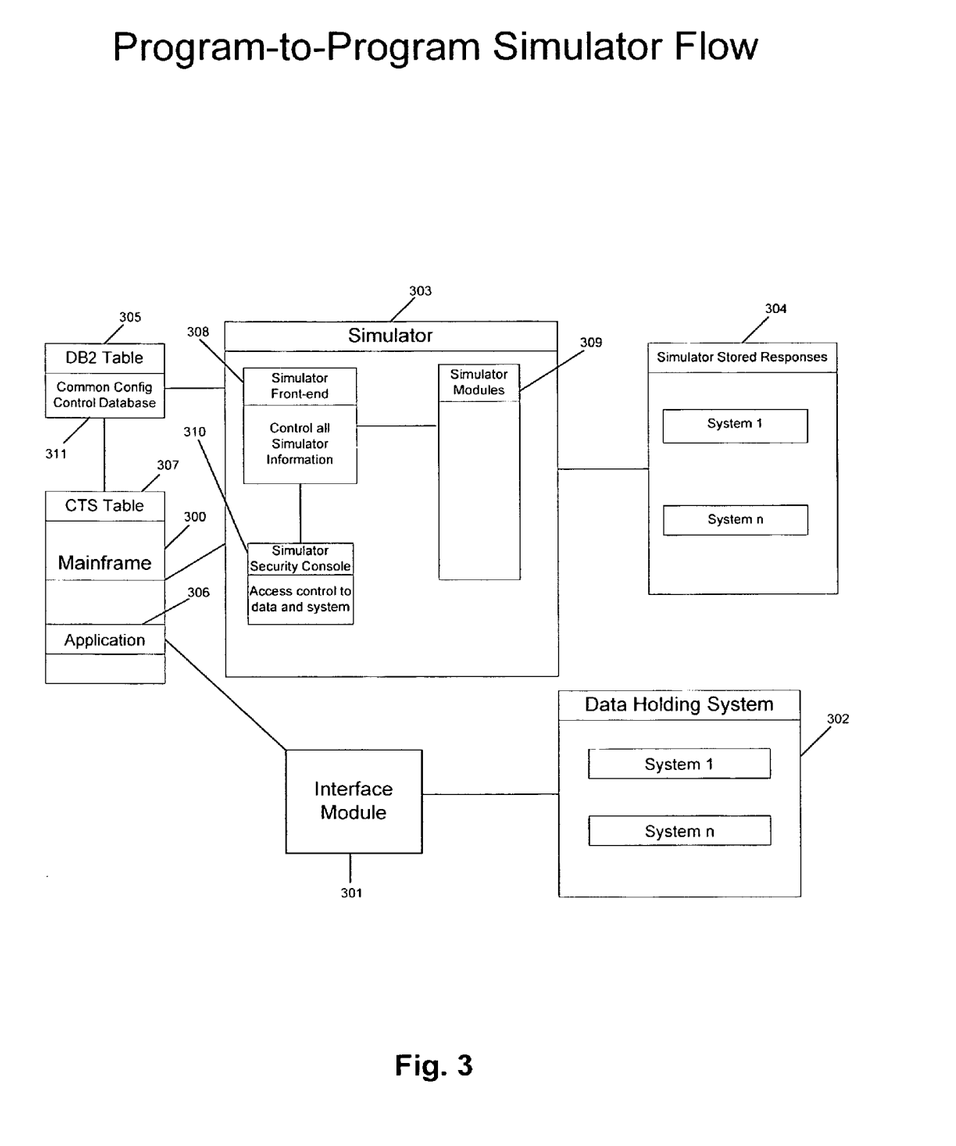
FIG. 3 is a schematic diagram illustrating an alternative arrangement of a testing system and apparatus.

FIG. 3 is a schematic diagram illustrating an alternative arrangement of a testing system and apparatus according to the present invention. The system shown in FIG. 3 includes components similar or identical to those of the system shown in FIG. 1. As like components in FIGS. 1 and 3 are identified by corresponding reference numerals, description of such components is omitted. The arrangement shown in FIG. 3 differs from that of FIG. 1 in respect of the connections between the components, and consequently the data flow, as will be described with reference to FIGS. 4A and 4B. As shown in FIG. 3, simulator 303 is not connected to interface module 301, in contrast to the arrangement of simulator 103 and interface module 101 in FIG. 1.

Figure 4A:
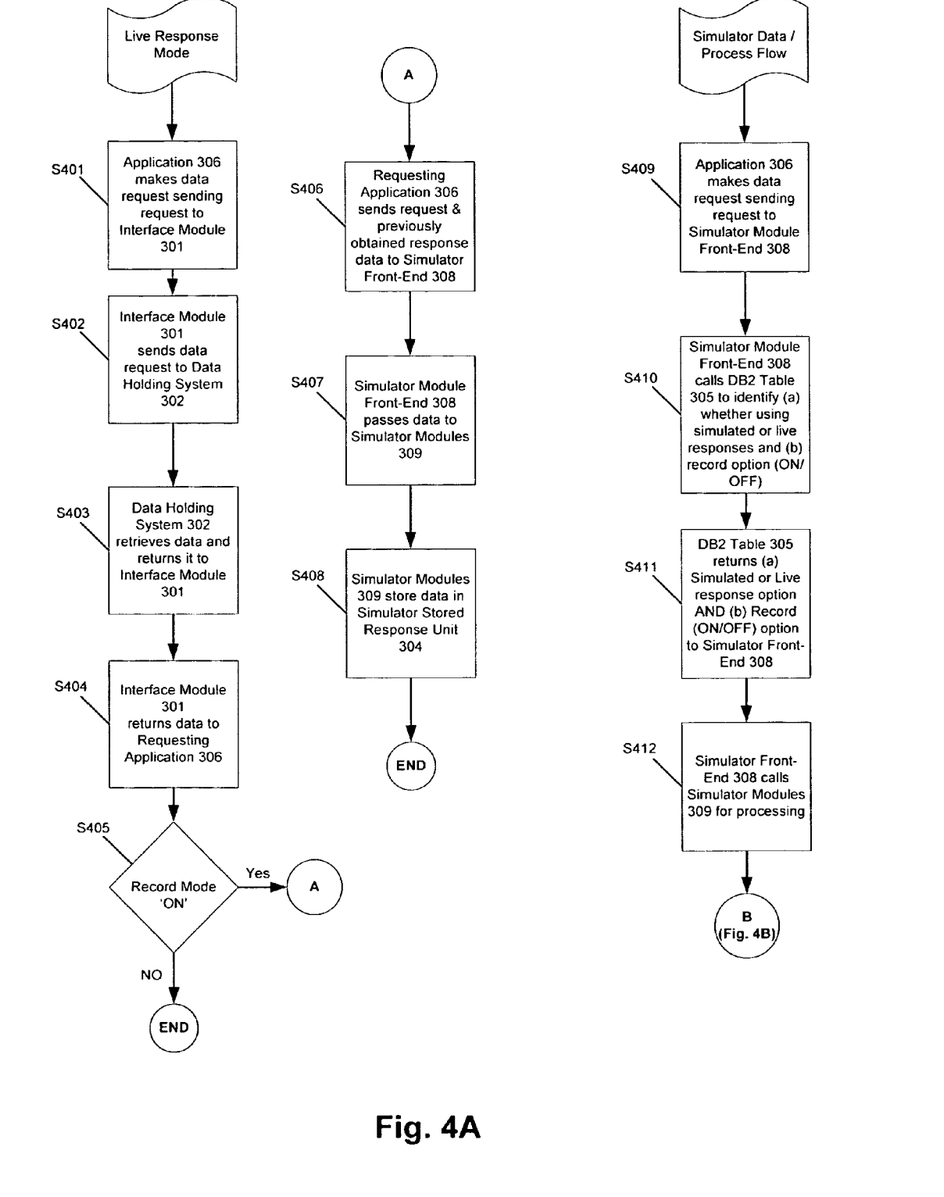
FIGS. 4A and 4B are flow charts illustrating methods of testing a process, by operating the testing system and apparatus of FIG. 3.
Figure 4B:
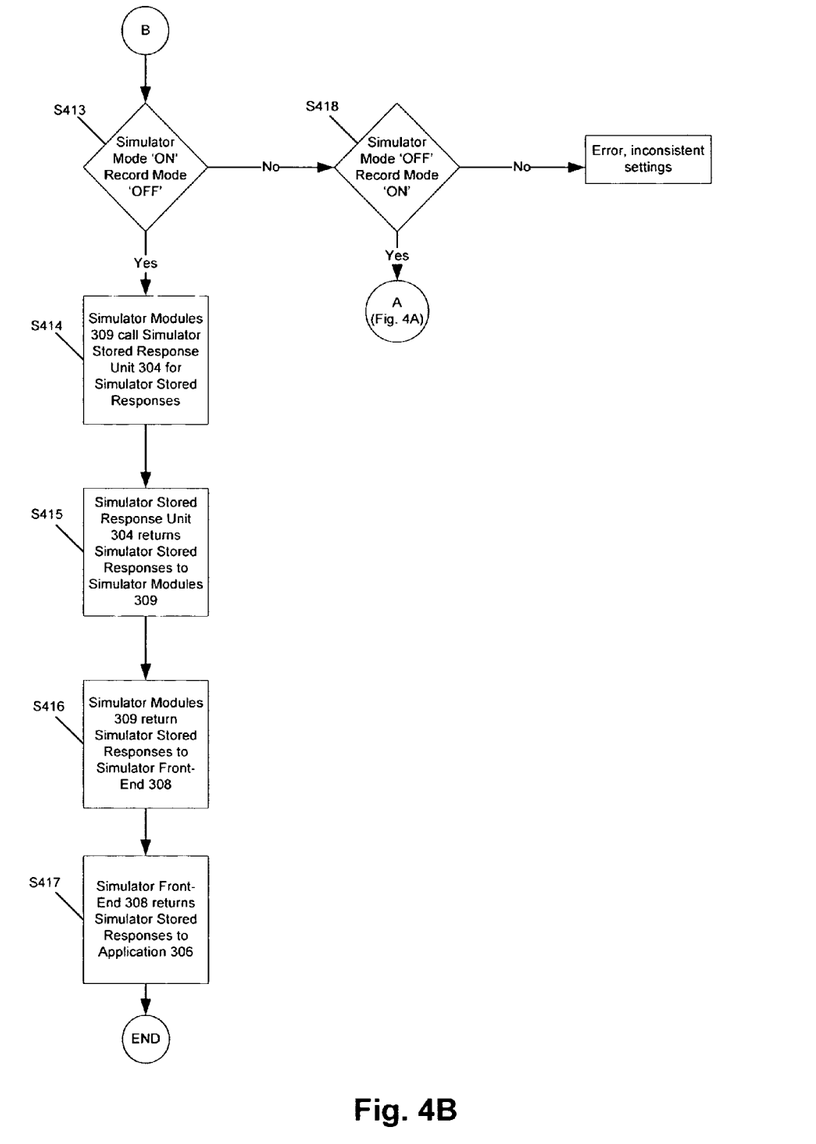

FIGS. 4A and 4B are flow charts illustrating methods of testing a process according to the present invention, by operating the testing system and apparatus of FIG. 3 in various modes.

Turning to FIG. 4A, the data flows of the live response mode with recording mode OFF and of the recorder mode (live response mode with recording mode ON) are illustrated under the heading "Live Response Mode." In step S401, application 306 sends a request to interface module 301. In step S402, interface module 301 sends the request to data holding system 302. The request is forwarded to the intended recipient system among the various n other systems of data holding system 302. In step S403, data holding system 302 retrieves the requested data from the intended recipient system and returns it to interface module 301. In step S404, interface module 301 returns the requested data to application 306. Thus, in steps S401 through S404, application 306 obtains live responses from the other systems with which it interacts in normal real-world performance of the process. The data flow of steps S401 through S404 is similar to the corresponding data flow shown in FIG. 2A (steps S201-S204).

In step S405 it is determined based on the mode information whether the recording mode is ON or OFF (the diamond shape of the box for step S405 shown in FIG. 4A indicates a decision box). If the recording mode is OFF, the data flow ends. If the recording mode is ON, then in step S406 application 306 sends the request and the live response previously obtained (in step S404) to simulator front end 308. In step S407, simulator front end 308 passes the request and the response to simulator modules 309. In step S408, simulator modules 309 store the request and the response in simulator stored response unit 304. The data flow ends after step S408.

Thus, in steps S406 through S408, the request and live response data is sent from application 306 (mainframe computer 300) to simulator 303 to be stored in the appropriate system(s) of simulator stored response unit 304. In contrast, in the arrangement of FIG. 1, the request data is obtained by simulator 103 from application 106 (step S205), the live response data is obtained by simulator 103 (via interface module 101) from the appropriate other system(s) in data holding system 102 (step S218), and both the request and live response data are stored by simulator 103 in simulator stored response unit 104 (steps S215 and S219). In the arrangement of FIG. 3, as noted, there is no connection between simulator 303, on the one hand, and data holding unit 302 and interface module 301, on the other hand. As discussed above with respect to FIGS. 2A and 2B, so too here the respective requests and responses, or data corresponding thereto, or the like, are stored in correlation with each other, for use by the simulator to send out correct stored responses when the system is used in simulator mode.

Under the heading of "Simulator Data/Process Flow" in FIGS. 4A and 4B, the data flows of the recorder mode (again) and of the simulator mode (simulated response mode with recording mode OFF) are illustrated. In step S409, application 306 sends a request to simulator front end 308. In step S410, simulator front end 308 calls DB2 Table 305 to obtain the mode information identifying which mode of operation of the system has been selected (i.e., the status of each of the two variables described above, namely, live response vs. simulated response and recoding mode ON/OFF). In step S411, DB2 Table 305 sends the mode information to simulator front end 308. In step S412, simulator front end 308 calls simulator modules 309 for processing. In steps S413 and (if necessary) S418, simulator modules 109 determine the selected mode of operation of the system by reference to the mode information (the diamond shape of the boxes for steps S413 and S418 shown in FIG. 4B indicates a decision box).

If at step S418 it is determined that the recorder mode (simulator mode OFF; record mode ON) has been selected, the data flow proceeds (returns) to steps S406 through S408 where, as discussed above, the request and live response data is sent from application 306 (mainframe computer 300) to simulator 303 to be stored in the appropriate system(s) of simulator stored response unit 304. Thus, as was the case with the data flows of FIGS. 2A and 2B, in the recorder mode, live responses are obtained from the real-world systems and the live responses are both returned to the application and stored in the simulator.

If at step S413 it is determined that the simulator mode (simulator mode ON; record mode OFF) has been selected, then in step S414, simulator modules 309 send the request to simulator stored response unit 304 for a stored response. In step S415, simulator stored response unit 304 returns a stored response to simulator modules 309. In step S416, simulator modules 309 return the stored response to simulator front end 308. In step S417, simulator front end 308 returns the stored response to application 306. The data flow ends after step S417. The data flow of steps S414 through S417 is similar to the corresponding data flow shown in FIG. 2B (steps S210-S213). As was seen with respect to FIG. 2B, so too here, in the simulator mode, the responses that were stored during the recording mode are obtained from the simulator stored response unit rather than live responses being obtained from the real-world other systems.

If after step S412 collective states of the variables other than those representing the recorder mode and the simulator mode, respectively, have been selected, the simulator deems the selected mode to be invalid. (As noted above with reference to FIGS. 2A and 2B, here too the combination of simulator mode OFF and record mode OFF corresponds to a valid data flow illustrated in FIG. 4A under the heading "Live Response Mode." While this is a valid mode of operation of the system, if this mode of operation has been selected the data flow does not go through simulator 303.)

The differences in the data flows of FIGS. 4A and 4B, as compared to those of FIGS. 2A and 2B, follow from the differences in the arrangement of system components and their connections shown in FIG. 3, as compared with the arrangement shown in FIG. 1. The differences in the data flows of FIGS. 4A and 4B as compared to those of FIGS. 2A and 2B do not necessarily reflect differences in the methods of testing, but they reflect differences in the underlying computer software and/or hardware or other equipment and operation thereof.

Example Implementations

The present invention, or any part(s) or function(s) thereof, may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 5:
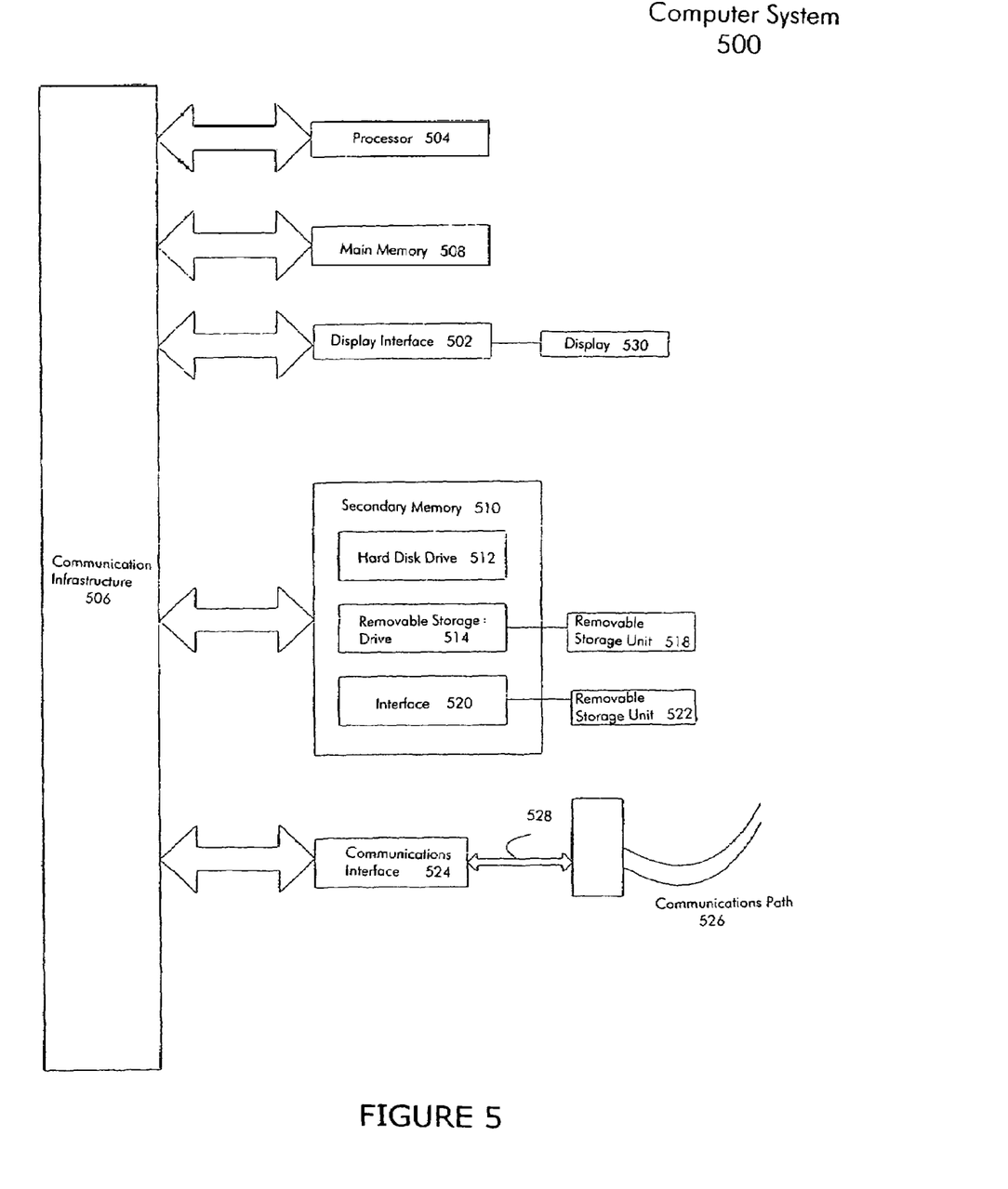
FIG. 5 is a schematic diagram of an exemplary computer system useful for implementing the present invention.

In fact, in one embodiment, the invention is directed toward one or more computer systems capable of carrying out the functionality described herein. An example of a computer system 500 is shown in FIG. 5.

The computer system 500 includes one or more processors, such as processor 504. The processor 504 is connected to a communication infrastructure 506 (e.g., a communications bus, cross-over bar, or network). Various software embodiments are described in terms of this exemplary computer system. After reading this description, it will become apparent to a person skilled in the relevant arts how to implement the invention using other computer systems and/or architectures.

Computer system 500 can include a display interface 502 that forwards graphics, text, and other data from the communication infrastructure 506 (or from a frame buffer not shown) for display on the display unit 530.

Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518 represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528 which may be electronic, electromagnetic, optical or other signals capable of being received by communications interface 524. These signals 528 are provided to communications interface 524 via a communications path (e.g., channel) 526. This channel 526 carries signals 528 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 514 and a hard disk installed in hard disk drive 512. These computer program products provide software to computer system 500. The invention is directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features of the present invention, as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant arts.

In yet another embodiment, the invention is implemented using a combination of both hardware and software.

CONCLUSION

While various embodiments of the present invention have been described above, it should be understood that they have been presented by way of example, and not limitation. It will be apparent to persons skilled in the relevant arts that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures appended hereto, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method of testing a process that has undergone modification, comprising:

(A) performing a first step in the process by transmitting a first transmission from an application to a first interfacing system, and obtaining a first response to the first transmission from the first interfacing system;

(B) performing a second step in the process by transmitting a second transmission from the application to the first or a second interfacing system, and obtaining a second response to the second transmission from the interfacing system to which the second transmission was transmitted;

(C) storing the first transmission or data based on the first transmission, the second transmission or data based on the second transmission, the first response or data based on the first response, and the second response or data based on the second response in a simulator adapted to transmit a response in response to a transmission, based on content of the transmission, so as to simulate transmission of a response from an interfacing system; and (D) after the first transmission or the data based on the first transmission, the second transmission or the data based on the second transmission, the first response or the data based on the first response, and the second response or the data based on the second response have been stored in the simulator and the process has been modified by modifying the second step of the process, testing the modified process by (i) performing the first step in the modified process by retransmitting the first transmission from the application to the simulator, and performing the modified second step in the modified process by retransmitting the second transmission from the application, and (ii) determining whether a response from the simulator to the retransmission of the first transmission and/or a response to the retransmission of the second transmission are expected responses, based on the modification made to the second step.

2. A method according to claim 1, wherein in (D)(i) the modified second step in the modified process is performed by retransmitting the second transmission from the application to the simulator.

3. A method according to claim 1, wherein the modification of the second step comprises a modification of a manner in which the second transmission is transmitted.

4. A method according to claim 1, wherein the modification of the second step comprises a modification of content included in the second transmission.

5. A method according to claim 1, wherein the modification of the second step comprises a modification of program code of a computer program used in performing the second step.

6. A method according to claim 1, wherein the modification of the second step comprises a change in or a replacement of the interfacing system to which the second transmission was transmitted, and in (D)(i) the modified second step in the modified process is performed by retransmitting the second transmission from the application to the changed or replacement interfacing system.

7. A method according to claim 1, further comprising:
(D)(iii) if the response to the retransmission of the first transmission and/or the response to the retransmission of the second transmission is determined in (ii) not to be the respective expected response based on the modification made to the second step, determining a way in which the response to the retransmission of the first transmission and/or the response to the retransmission of the second transmission differs from the respective expected response.

8. A computer program product comprising a computer-usable medium having control logic stored therein for causing a computer to test a process that has undergone modification, the control logic comprising:
first computer-readable program code for causing the computer to perform a first step in the process by transmitting a first transmission from an application to a first interfacing system, and obtaining a first response to the first transmission from the first interfacing system;
second computer-readable program code for causing the computer to perform a second step in the process by transmitting a second transmission from the application to the first or a second interfacing system, and obtaining a second response to the second transmission from the interfacing system to which the second transmission was transmitted;
third computer-readable program code for causing the computer to store the first transmission or data based on the first transmission, the second transmission or data based on the second transmission, the first response or data based on the first response, and the second response or data based on the second response in a simulator adapted to transmit a response in response to a transmission, based on content of the transmission, so as to simulate transmission of a response from an interfacing system; and
fourth computer-readable program code for, after the first transmission or the data based on the first transmission, the second transmission or the data based on the second transmission, the first response or the data based on the first response, and the second response or the data based on the second response have been stored in the simulator and the process has been modified by modifying the second step of the process, causing the computer to test the modified process by (i) performing the first step in the modified process by retransmitting the first transmission from the application to the simulator, and performing the modified second step in the modified process by retransmitting the second transmission from the application, and (ii) determining whether a response from the simulator to the retransmission of the first transmission and/or a response to the retransmission of the second transmission are expected responses, based on the modification made to the second step.

9. A computer program product according to claim 8, wherein the modified second step in the modified process is performed by retransmitting the second transmission from the application to the simulator.

10. A computer program product according to claim 8, wherein the modification of the second step comprises a modification of a manner in which the second transmission is transmitted.

11. A computer program product according to claim 8, wherein the modification of the second step comprises a modification of content included in the second transmission.

12. A computer program product according to claim 8, wherein the modification of the second step comprises a modification of program code of a computer program used in performing the second step.

13. A computer program product according to claim 8, wherein the modification of the second step comprises a change in or a replacement of the interfacing system to which the second transmission was transmitted, and the modified second step in the modified process is performed by retransmitting the second transmission from the application to the changed or replacement interfacing system.

14. A computer program product according to claim 8, wherein the fourth computer-readable program code is for causing the computer to test the process by also (iii) if the response to the retransmission of the first transmission and/or the response to the retransmission of the second transmission is determined in (ii) not to be the respective expected response based on the modification made to the second step, determining a way in which the response to the retransmission of the first transmission and/or the response to the retransmission of the second transmission differs from the respective expected response.

15. A system for testing a process that has undergone modification, comprising:
a recording unit for:
(A) performing a first step in the process by transmitting a first transmission from an application to a first interfacing system, and obtaining a first response to the first transmission from the first interfacing system;
(B) performing a second step in the process by transmitting a second transmission from the application to the first or a second interfacing system, and obtaining a second response to the second transmission from the interfacing system to which the second transmission was transmitted; and
(C) storing the first transmission or data based on the first transmission, the second transmission or data based on the second transmission, the first response or data based on the first response, and the second response or data based on the second response in a simulator adapted to transmit a response in response to a transmission, based on content of the transmission, so as to simulate transmission of a response from an interfacing system; and
a simulation unit for:
(D) after the first transmission or the data based on the first transmission, the second transmission or the data based on the second transmission, the first response or the data based on the first response, and the second response or the data based on the second response have been stored in the simulator and the process has been modified by modifying the second step of the process, testing the modified process by (i) performing the first step in the modified process by retransmitting the first transmission from the application to the simulator, and performing the modified second step in the modified process by retransmitting the second transmission from the application, and (ii) determining whether a response from the simulator to the retransmission of the first transmission and/or a response to the retransmission of the second transmission are expected responses, based on the modification made to the second step.

16. A system according to claim 15, wherein in (D)(i) the modified second step in the modified process is performed by retransmitting the second transmission from the application to the simulator.

17. A system according to claim 15, wherein the modification of the second step comprises a modification of a manner in which the second transmission is transmitted.

18. A system according to claim 15, wherein the modification of the second step comprises a modification of content included in the second transmission.

19. A system according to claim 15, wherein the modification of the second step comprises a modification of program code of a computer program used in performing the second step.

20. A system according to claim 15, wherein the modification of the second step comprises a change in or a replacement of the interfacing system to which the second transmission was transmitted, and the modified second step in the modified process is performed by retransmitting the second transmission from the application to the changed or replacement interfacing system.

21. A system according to claim 15, wherein the simulation unit is for testing the process by also (D)(iii) if the response to the retransmission of the first transmission and/or the response to the retransmission of the second transmission is determined in (ii) not to be the respective expected response based on the modification made to the second step, determining a way in which the response to the retransmission of the first transmission and/or the response to the retransmission of the second transmission differs from the respective expected response.

* * * * *